T. MIDGLEY, Sr. & T. MIDGLEY, Jr.
METHOD OF PRODUCING COLLAPSIBLE CORES.
APPLICATION FILED JAN. 10, 1917.

1,289,223.

Patented Dec. 31, 1918.

UNITED STATES PATENT OFFICE.

THOMAS MIDGLEY, SR., AND THOMAS MIDGLEY, JR., OF COLUMBUS, OHIO.

METHOD OF PRODUCING COLLAPSIBLE CORES.

1,289,223.   Specification of Letters Patent.   Patented Dec. 31, 1918.

Application filed January 10, 1917. Serial No. 141,528.

*To all whom it may concern:*

Be it known that we, THOMAS MIDGLEY, Sr., and THOMAS MIDGLEY, Jr., citizens of the United States, residing at the city of Columbus, in the county of Franklin and State of Ohio, have invented certain new and useful Improvements in Methods of Producing Collapsible Cores, of which the following is a specification.

This invention relates to a method of producing collapsible cores for use in the manufacture of pneumatic tires and represents essentially an improved method, which consists in making and forming a core, which represents the step intermediate the inventions claimed in our Patents #1,157,117 and #1,157,118, issued October 19, 1915. One of these patents relates to the method of casting the core and the other to the finished article, while this invention represents the step intermediate these two, which is both the making and finishing of the core. This present invention is, however, not limited to use in connection with the method and article described in the foregoing patents, as it may perhaps also be used advantageously in other types of cores.

Wherever the segments of collapsible cores are so cut and the ends fastened with face plates, that the edges of these face plates come into parallelism with the cutting edge of the tool during the finishing process involving the use of a tool whose cutting edge covers an appreciable surface of the core and is also shaped to conform to the shape of the finished core, this tool will jump or chatter or cause the breaking of either the tool or the core when the face plates pass beneath the tool. This possibly is because the plate material is harder or of a different texture than the cast material. We have discovered, however, that where these face plates engage the tool in a non-parallel or angular relation to cause a more or less slicing or angular shearing of the plate material rather than a direct shear cut, this jumping or chattering or breaking, does not occur. The jumping or chattering, as outlined above, results in the surface of the core in which the plates are located, being of a size slightly different from the remainder and it is well known in the art of manufacturing pneumatic tires, that a core which is a few thousandths of an inch out of true, does not produce a good tire. Therefore, it is the object of this invention to set forth a method in which the jumping or chattering or breaking does not occur and in which the core is finished to uniform size throughout its circumference.

Figure 1:
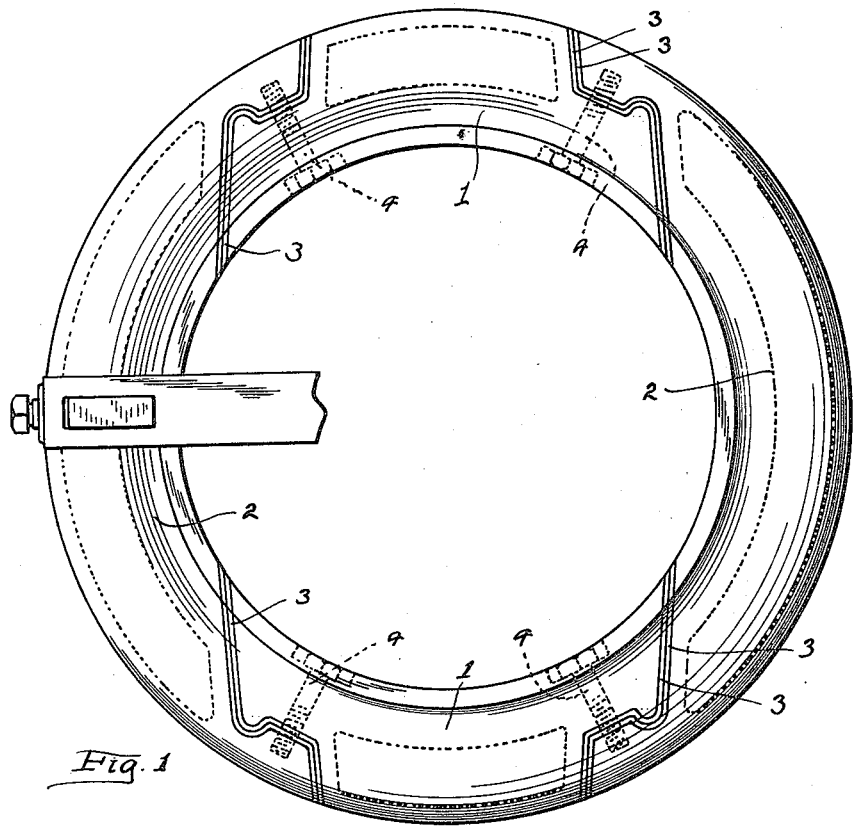
Figure 2:
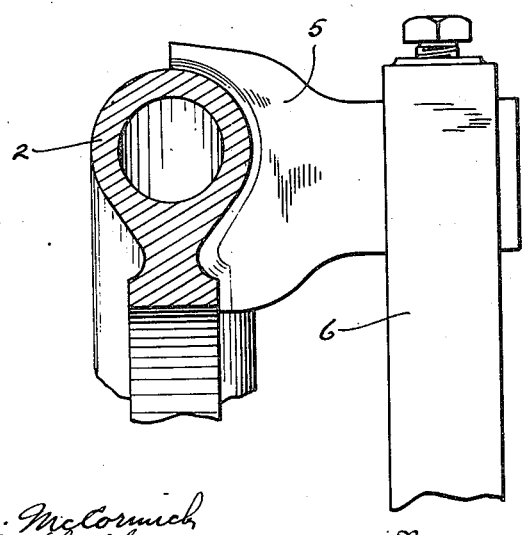

The accompanying drawings represent diagrammatically the manner in which this method may be put into use and in these drawings similar characters of reference designate corresponding parts, and Figure 1 shows a collapsible core constructed in accordance with the principles of this invention and shown in operative position with respect to a cutting tool, and, Fig. 2 is a cross section taken through Fig. 1 showing the tool in its operative position.

In our patents referred to, we have described one method in which a core somewhat of the character shown may be constructed, but it will be understood that our invention embraces any type of core which is formed in segments, which segment ends are faced and wherein all of the plates are made to bear a non-parallel relation with the cutting edge of the tool. In the drawings, there is shown a core formed of four segments, the segments 1 being of identical structure and the segments 2 also of identical structure, but different from the segments 1. Each end of each of the segments is provided with a face plate 3 which is preferably of steel and the four sections are held assembled by means of the threaded bolts 4. To form a core as is shown, we have properly shaped the plates 3 and placed them within the imprint in the mold and then formed the core by casting so that the metal forming the various sections, adheres to the plates. These sections, as related, are held assembled by means of the bolts 4 which may be applied, as may be desired. The rough assembled sections present an unfinished surface and the plates 3 are of a size to project to the exterior of the unfinished core. This assembled core is then given a partial finish and this finish is then completed by means of the tool shown at 5. It will be noted that the cutting edge of this tool is shaped to conform to the contour of approximately one-half of the exterior of the core itself and is suitably mounted within any desired type of tool support 6. The tool and core are then given a relative rotation to complete the finish. An inspection of Fig. 1 will show that all of the plates 3 are located in non-radial alinement with the core and also in such relation to the cutting edge of the tool, that at no time will the cutting edge of this tool and the plates lie in parallelism. By this arrangement, the cutting edge of the tool will engage the face plates at an angle and thereby cause somewhat of a slicing or angular shearing action as the tool passes over the plates rather than a direct cut. Also, the tool will engage only a small portion of each of the faces at one time and in this manner, the tool is prevented from chattering or jumping, thereby causing the core to be of a uniform size throughout its circumference. After one side of the core has been thus finished, it may be turned over and the opposite side finished.

From the foregoing, it will be apparent that we have explained an improved method whereby tire cores may be finished in which the face plates may be turned up to size by the use of the same tool which operates upon the major core sections and at the same time that these core sections are being finished.

What we claim, is:

1. The herein described method of producing collapsible cores for tires which consists in forming a core of a plurality of segments each end of each of which has been provided with a face plate which projects to the exterior of the unfinished core, and surfacing the core with a tool whose cutting edge contacts with an appreciable surface of the core and is shaped throughout its cutting edge to conform to the shape of the finished core and locating said tool and plates relatively so that during the cutting action the cutting edge of the tool is out of parallelism with the edges of any of said plates as they pass beneath the tool during the relative rotation between the core and tool.

2. The herein described method of producing collapsible cores for tires which consists in forming a core of a plurality of segments each end of each of which has been provided with a face plate which projects to the exterior of the unfinished core and surfacing the core with a tool whose cutting edge contacts with an appreciable surface of the core and is shaped throughout its cutting edge to conform to the shape of the finished core and locating said tool and plate relatively so that during the cutting action the cutting edge of the tool passes over the edges of all of said plates in an angular manner.

3. The herein described method of producing collapsible cores for tires which consists in forming a core of a plurality of segments all of whose ends are non-radially disposed and each end of each of which is provided with a face plate which projects to the exterior of the unfinished core and surfacing the core with a radially disposed tool whose cutting edge contacts with an appreciable surface of the core and is shaped throughout its cutting edge to conform to the shape of the finished core.

In testimony whereof we affix our signatures in presence of two witnesses.

THOMAS MIDGLEY, Sr.
THOMAS MIDGLEY, Jr.

Witnesses:
  N. R. Haas,
  Carl Mowry.